(12) United States Patent
Boe

(10) Patent No.: US 7,884,341 B2
(45) Date of Patent: Feb. 8, 2011

(54) MODULAR HEADREST AND MULTI- LIGHT APPARATUS

(76) Inventor: Irwin N. Boe, 14442 Chadwick St., Leawood, KS (US) 66224

( * ) Notice: Subject to any disclaimer, the term of this patent is extended or adjusted under 35 U.S.C. 154(b) by 327 days.

(21) Appl. No.: 11/741,724

(22) Filed: Apr. 28, 2007

(65) Prior Publication Data

US 2008/0265181 A1     Oct. 30, 2008

(51) Int. Cl.
*G01J 1/00*     (2006.01)
(52) U.S. Cl. .................. 250/504 R; 385/115; 362/573; 362/572; 362/574
(58) Field of Classification Search ............ 250/504 R, 250/494.1; 362/573
See application file for complete search history.

(56) References Cited

U.S. PATENT DOCUMENTS

| | | | | |
|---|---|---|---|---|
| 3,726,012 A | * | 4/1973 | Grayson et al. ............... | 433/79 |
| 4,149,086 A | * | 4/1979 | Nath ....................... | 250/504 R |
| 5,281,134 A | * | 1/1994 | Schultz ...................... | 433/29 |
| 6,089,740 A | * | 7/2000 | Forehand et al. ............ | 362/573 |
| 6,290,713 B1 | * | 9/2001 | Russell ....................... | 607/88 |
| 6,413,268 B1 | * | 7/2002 | Hartman ..................... | 607/94 |
| 6,719,447 B1 | * | 4/2004 | Woodward et al. .......... | 362/573 |
| 2004/0061038 A1 | * | 4/2004 | Solich ........................ | 248/444 |
| 2005/0286845 A1 | * | 12/2005 | Plocharczyk ................ | 385/115 |
| 2006/0285316 A1 | * | 12/2006 | Tufenkjian et al. .......... | 362/105 |

* cited by examiner

*Primary Examiner*—Jack I Berman
*Assistant Examiner*—Johnnie L Smith

(57) ABSTRACT

A multi-light apparatus (10) for primary use in dental or medicinal operatory workspaces and for interconnection with a modular operating chair (12), so as to form the headrest thereof, preferably includes first and second radiation sources (36,72) and a selection mechanism (70) for selecting a desired radiation source, a rigidly flexible light pipe (16) that may be alternatively coupled to each light source (36,72) and is configured to transmit selected radiation to a patient (14), a reflective surface (78) configured to direct the selected radiation to the pipe (16), a power supply (50), a cooling fan (56), and at least one potentiometer (66,68) for varying the voltage delivered to the sources (36,72) and fan (56).

20 Claims, 5 Drawing Sheets

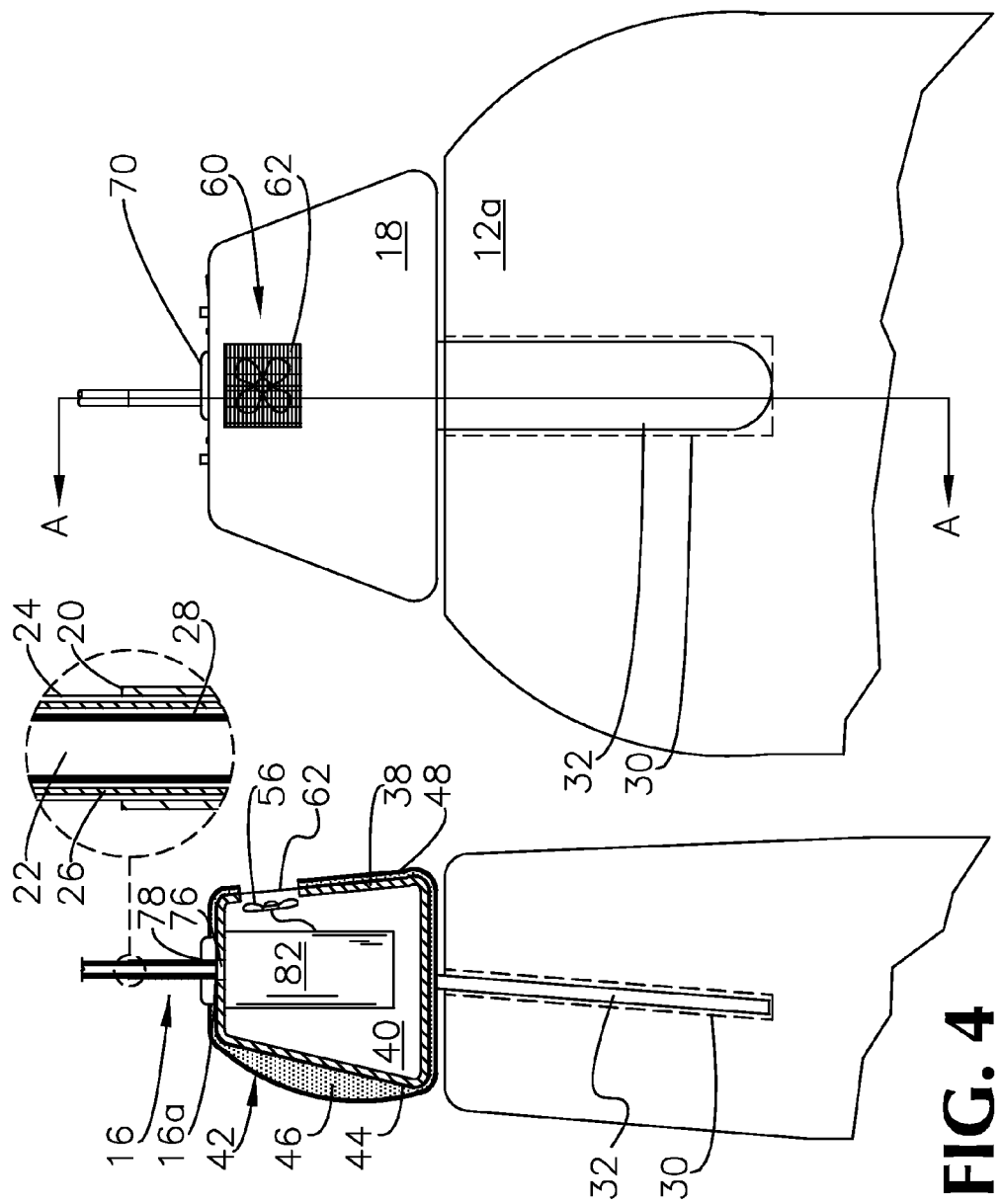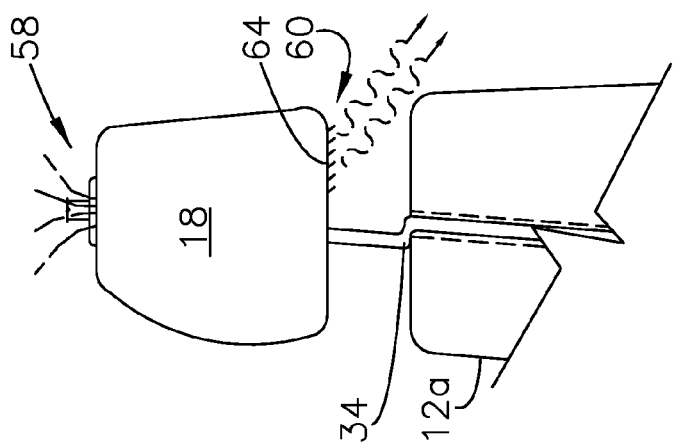

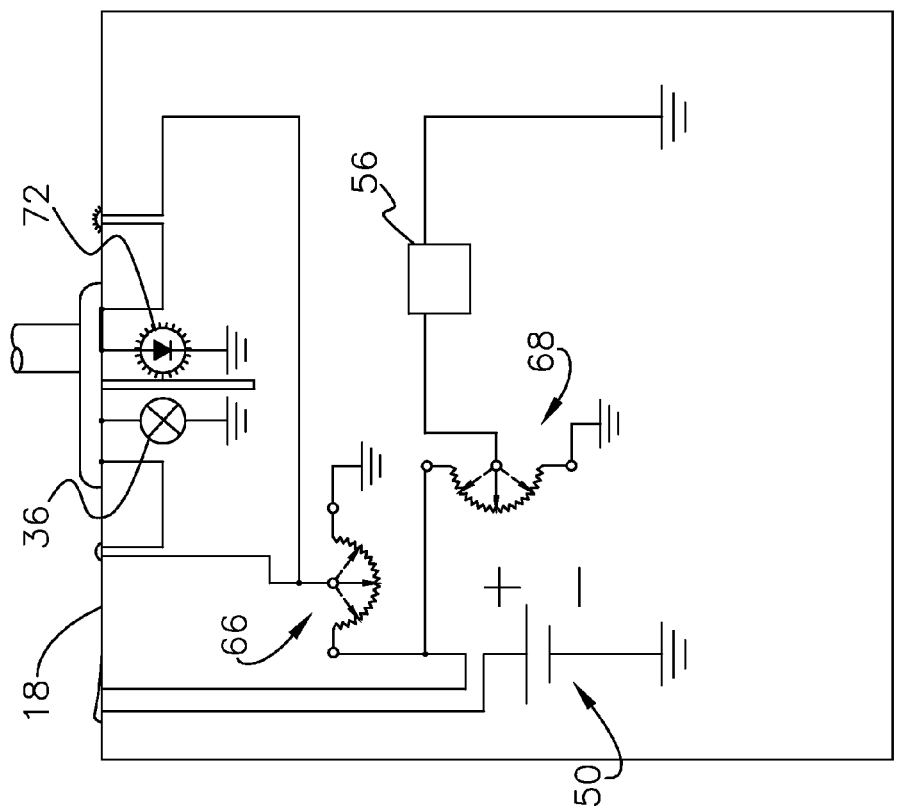
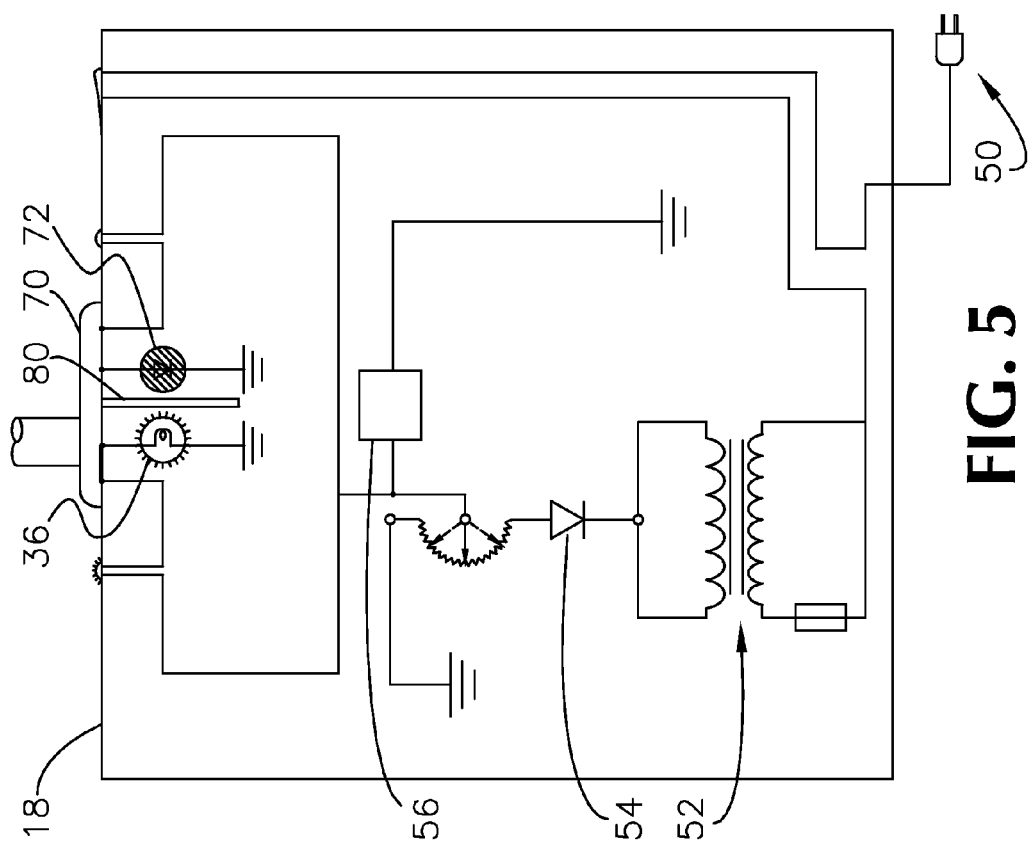
FIG. 6
FIG. 5

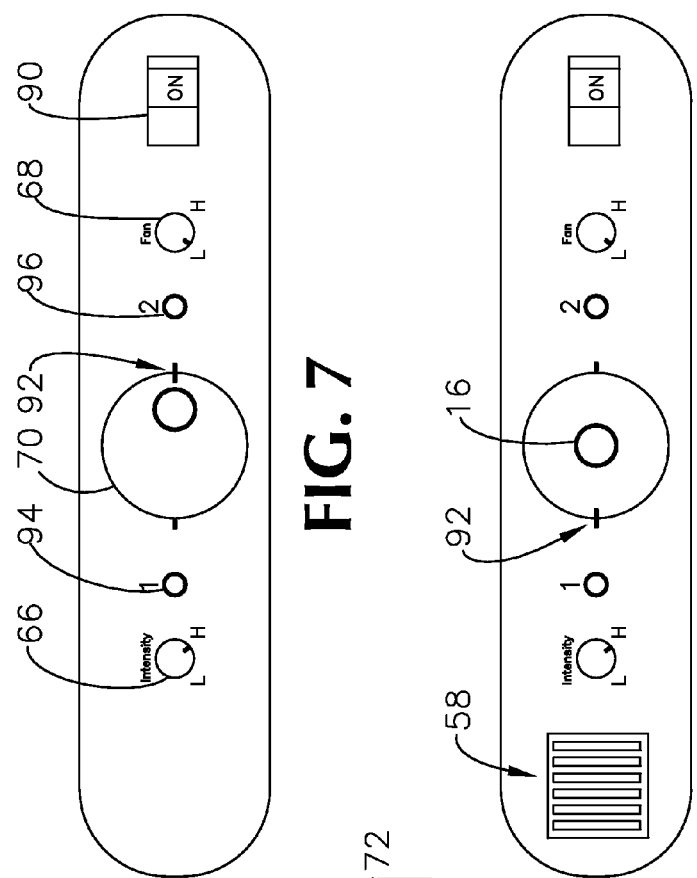
FIG. 7
FIG. 7a
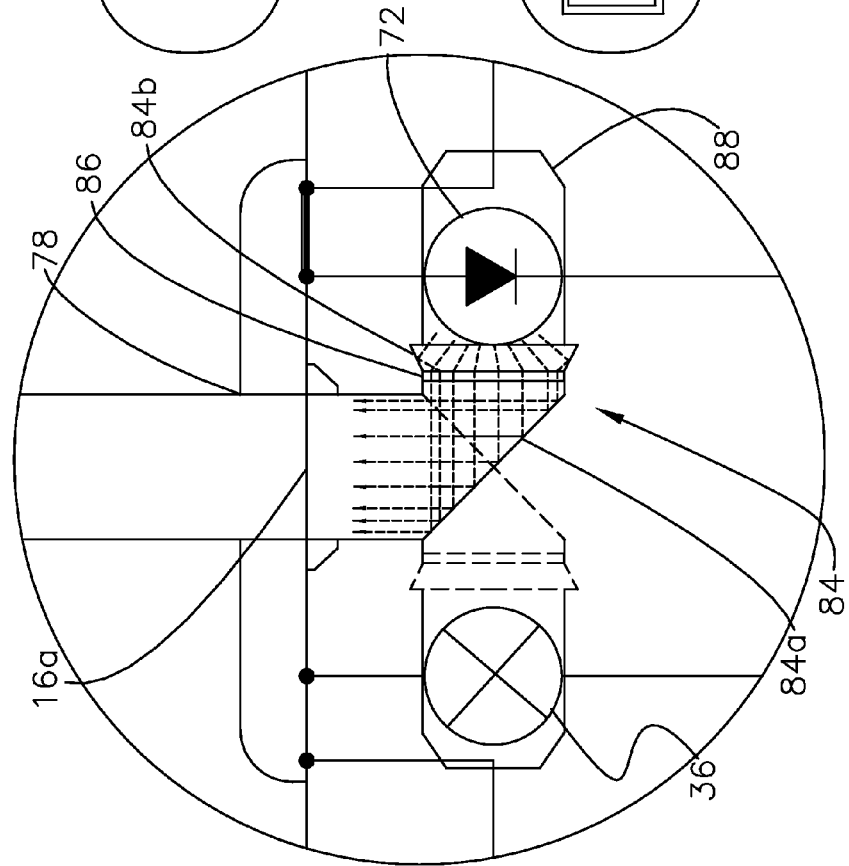
FIG. 6a

MODULAR HEADREST AND MULTI- LIGHT APPARATUS

BACKGROUND OF THE INVENTION

1. Technical Field

The present invention relates to apparatuses, systems, and methods of illuminating and/or providing alternative radiation to a dental or medicinal patient. More particularly, the present invention relates to a multi-light apparatus adapted for use and interconnection with a modular dental or medical chair, and comprising at least one light source, a housing cooperatively configured with the chair to present the headrest thereof, and a rigidly flexible light pipe coupled to the source and presenting an adjustably repositionable outlet.

2. Background Art

Peripheral lighting apparatuses and instruments have long been developed to serve the critical task of illuminating dental and medicinal operatory areas. More recently, specialty lighting techniques have also been developed that aid in curing photo-initiated compounds, treating various surficial ailments, and enabling other radiation based functions such as transillumination in dentistry. Examples of conventional overhead apparatuses and systems can be seen in FIG. 27 of U.S. Pat. No. 7,139,068, and commercially include Lucent and Advanced Operatory Lights sold by Thompson Dental Equipment of Gavilan Hills, Calif. While enabling visibility, the addition of these often bulky lighting apparatuses in the workspace and usually in close proximity to the patient has resulted in various practical concerns.

For example, increased crowding in the workspace often cause inconvenience to an operator, such as the treating dentist, doctor, nurse, or technician. Where the instrument affects performance or hinders access to the patient, it may further present a danger. In some instances, inconvenience to operators may be also caused by asymmetric configurations, and more particularly, by non-interchangeable left and right handed configurations. Of further concern, overhead apparatus often present only incremental adjustment capabilities, especially where limited by tracks and/or guides. Thus, it is appreciated by those of ordinary skill in the art that these concerns combine to reduce the efficiency of operation.

Portable lighting apparatuses have been developed, such as is commercially available from DNTLworks Equipment Corporation of Centennial, Colo. under the Fiber Optic Operatory Light product line, which reduce workspace obstruction. However, these portable devices also include a wheeled floor stand, tripod or other structure for support. As such, additional appurtenances are still necessary within the workspace, and the same concerns are present albeit to a lesser extent.

A few hand-held lighting devices have, likewise, been introduced to further reduce obstruction and increase freedom of movement. These devices, such as the instruments presented in U.S. Pat. Nos. 6,918,762 and 6,419,483, typically include a light source within a hand-held casing, collimating, reflecting, and/or filtering means to organize the light generated by the source, and then an outlet for directing the light towards the patient. However, these devices also result in inconvenience to the operator primarily in that one hand must be occupied to hold the light. Where an additional staff member is utilized to hold the device laborious costs are incurred. Finally, it is appreciated that these devices are typically relegated to curing light and other low power output applications, as significant measures would have to be taken to protect the operator from the large quantities of heat energy generated during incandescence light production.

SUMMARY OF THE INVENTION

Responsive to these and other concerns, the present invention provides a novel headrest and multiple light apparatus. The invention is useful among other things for reducing workspace obstruction by replacing a conventional headrest with the inventive apparatus. As a result virtually no additional support structure is introduced within the operatory workspace. The apparatus is further useful for providing increased adjustability and maneuverability pertaining to the point of light emission. Finally, the apparatus is further useful for providing multiple light sources for performing a variety of functions, including illumination, curing and bleaching.

A first aspect of the invention concerns an operational light apparatus adapted for use and interconnection with a modular operating chair, and for illuminating a patient positioned within the chair. The apparatus includes a light source configured to produce a quantity of light having a minimum luminosity value when energized. Also included is a light pipe defining an inlet communicatively coupled to the light source, a longitudinal pipe length, and an outlet positioned at a first location and configured to transmit the light towards the patient. A housing configured to retain the light source, connected to the pipe at or near the inlet, and presenting a soft exterior surface is also included. Finally, a power supply communicatively coupled to and operable to energize the light source is provided. The housing and chair are cooperatively configured such that the housing presents the headrest of the chair when interconnected, and the soft exterior surface engages the head of the patient when the patient is positioned within the chair.

A second aspect of the invention further concerns a multilight apparatus adapted for use and interconnection with a modular operating chair, and for selectively producing and engaging the patient with multiple types of radiation. In this configuration, the apparatus includes at least one light source configured to produce a plurality of differing types of radiation when energized, and a selection mechanism is configured to cause the light source to produce a selected radiation type. A light pipe defining an inlet able to be communicatively coupled to each of said at least one light source is further provided. A housing is configured to retain said at least one light source, and is connected to the pipe at or near the inlet.

Further disclosure is made as to preferred and exemplary embodiments of the invention including the provision of a cooling mechanism such as a fan retained within the housing, an ultra-violet light source, and a selection mechanism including a dial for choosing between and energizing the light sources. These and other features of the present invention are discussed in greater detail in the section below entitled DESCRIPTION OF THE PREFERRED EMBODIMENT (S).

BRIEF DESCRIPTION OF THE DRAWINGS

Preferred embodiments of the invention are described in detail below with reference to the attached drawing figures, wherein:

FIG. 3 is a rear elevation of the apparatus shown in FIG. 1, particularly illustrating a cooling fan, airflow outlet, and male connection prong;

FIG. 4 is a cross-section of the apparatus as delineated by section A-A in FIG. 3, further illustrating a housing, an interior protective sleeve, the fan, outlet and prong;

FIG. 4a is a fragmentary side elevation of the apparatus and chair in accordance with a preferred embodiment of the invention, particularly illustrating the illuminator/headrest being spaced from the back rest by a bent male connecting prong, and alternative cooling air-flow patterns facilitated thereby;

FIG. 5 is an electrical schematic and diagrammatic elevation of the innerworkings of the illuminator in accordance with a preferred embodiment of the invention, particularly illustrating first and second light sources, a transformer, a potentiometer, and an alternating current adaptor;

FIG. 6 is an electrical schematic and diagrammatic elevation of the innerworkings of the illuminator in accordance with a preferred embodiment of the invention, particularly illustrating dual potentiometers, and a battery power supply;

FIG. 6a is a partial diagrammatic elevation of the innerworkings of the illuminator in accordance with a preferred embodiment of the invention, wherein a rotatable tubular member having a reflective surface is presented intermediate and configured to engage the selected first or second light source;

FIG. 7 is a planar view of the top surface of the apparatus in accordance with a preferred embodiment of the invention, particularly illustrating a main on/off switch, first and second light source indicators, light source and fan potentiometers, and a light actuating and pipe orienting dial; and FIG. 7a is a planar view of the top surface of the apparatus in accordance with a preferred embodiment of the invention, particularly illustrating an air inlet, a main on/off switch, first and second light source indicators, light source and fan potentiometers, and a light actuating and mirror positioning dial.

DETAILED DESCRIPTION OF THE PREFERRED EMBODIMENT(S)

Figure 1:
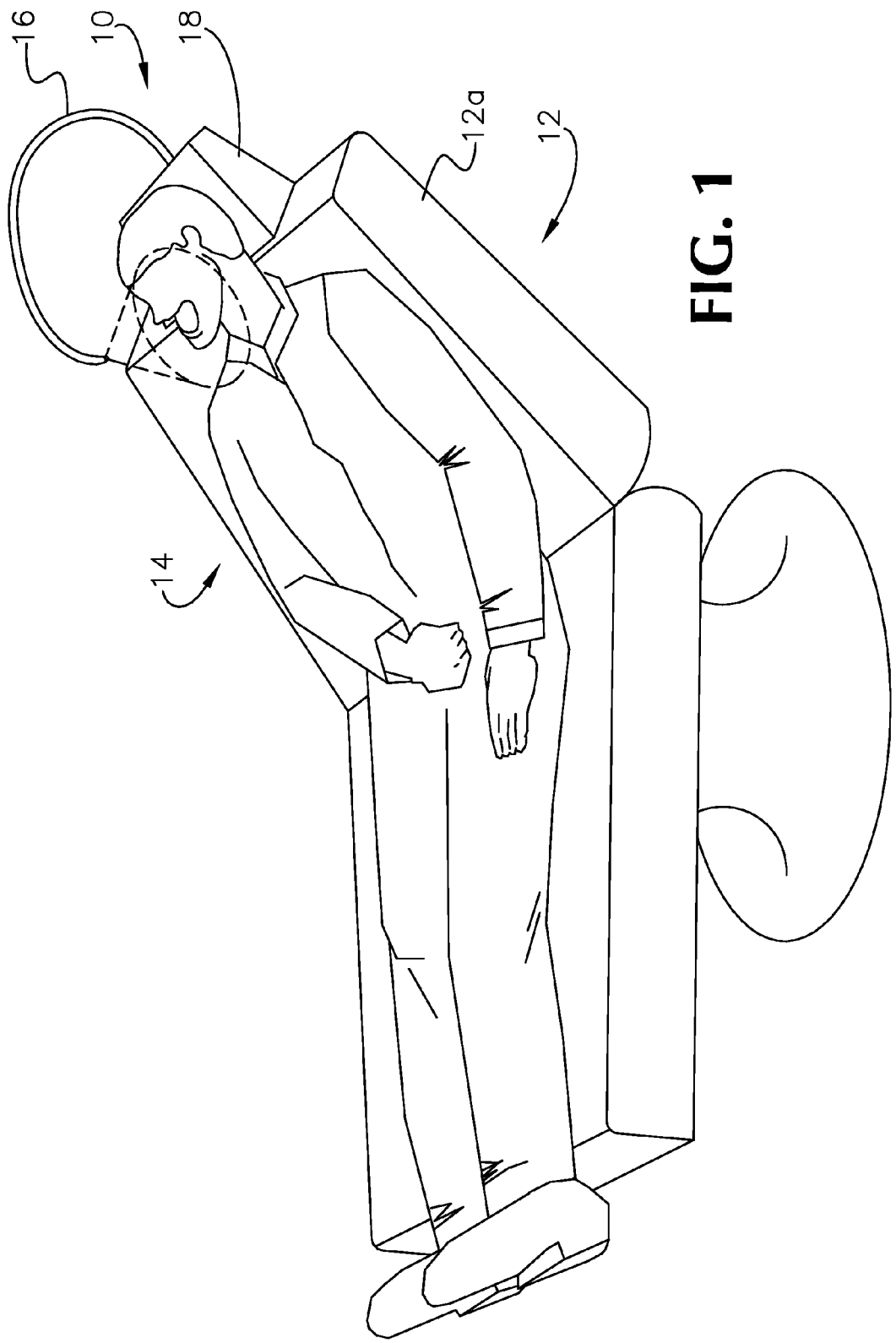
FIG. 1 is a perspective view of a modular headrest and operational light apparatus in accordance with a preferred embodiment of the invention, particularly illustrating the engagement of the apparatus with an operational chair and patient.

As illustrated and described herein, the present invention relates to a headrest and light apparatus 10 adapted for use and interconnection with a modular operating chair 12. The apparatus 10, as shown in FIG. 1, is configured to illuminate a patient 14 within a desired operatory area. It is the primary intent of the invention for the apparatus 10 to be utilized in the dental and medical professions; however, it is within the ambit of the invention for the apparatus 10 to also be used in other modular-chair based environments where minimal workspace obstruction and a highly adjustable light source is desired. Where not further described herein materials and/or methods of manufacture or construction shall be deemed to involve conventional and future equivalent means.

I. Modular Headrest and Operational Light Apparatus

Figure 2:
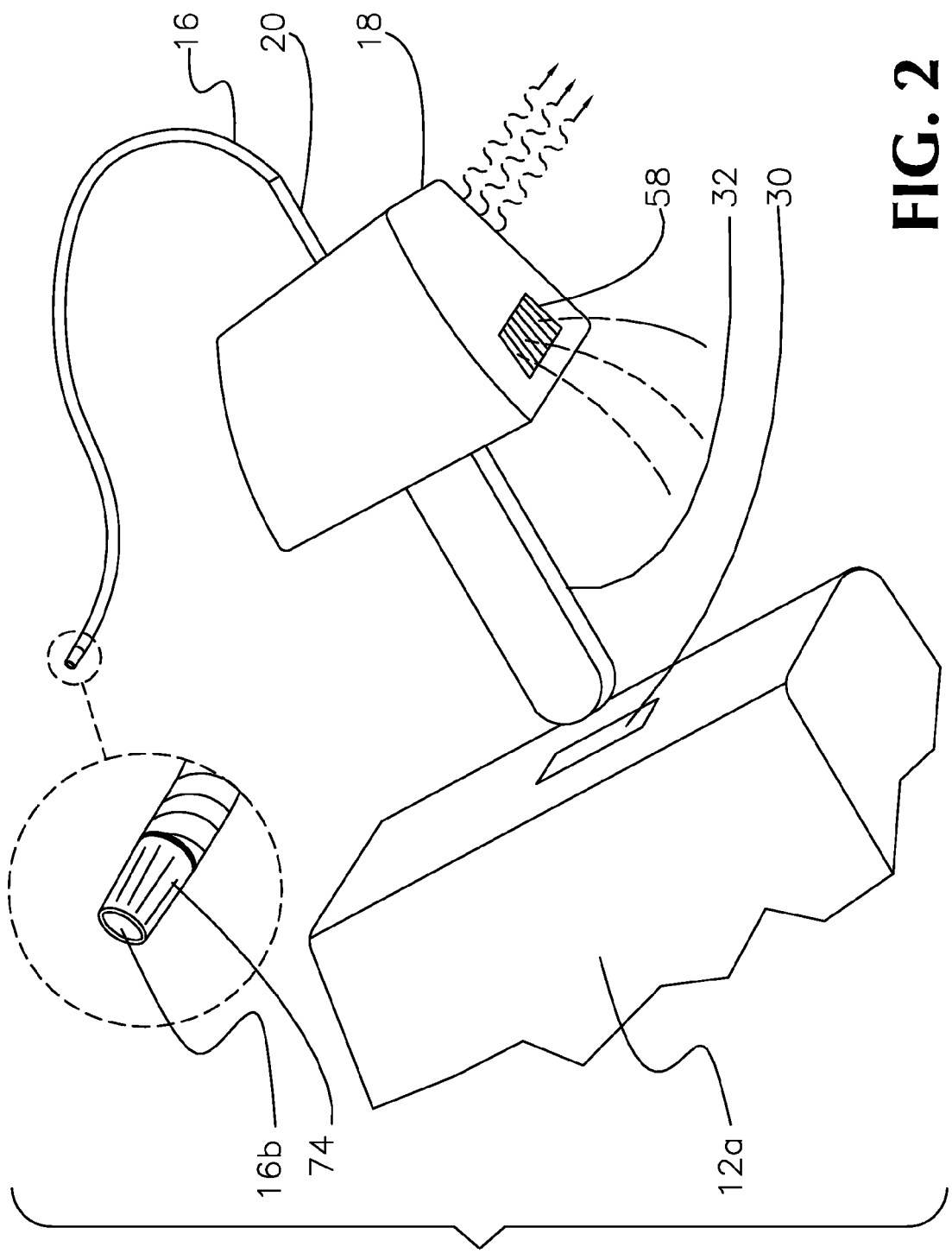
FIG. 2 is an enlarged perspective view of the apparatus shown in FIG. 1, particularly illustrating the headrest disconnected from the backrest of the chair, an adjustable pipe tip, and cooling airflow patterns.

As best shown in FIGS. 1, 2, and 4, the apparatus 10 generally includes a light pipe 16 presenting a light receiving inlet 16a, light emitting outlet 16b at a first location, and an illuminator/headrest 18 connected to the light pipe 16 and interconnectable with the operatory chair 12. The pipe 16 preferably presents a rigidly flexible structure; whereas the phrase "rigidly flexible," as used herein, shall mean able to be manually, repeatedly and inelastically bent into one of a plurality of functional conditions wherein the outlet is securely repositioned.

The preferred pipe 16 further presents a longitudinal pipe length sufficient to effect the intended purpose. For example, as illustrated in FIG. 1, where utilized to illuminate the oral cavity of a patient, the pipe length is preferably within the range of 60 to 120 cm (i.e., approximately 2 to 4 ft), so as to be manipulable around the head of the patient 14. To further avoid contact with the patient's head, the pipe 16 preferably presents a non-flexible section (i.e., "extender") 20 adjacent the illuminator 18 (FIG. 2). The non-flexible pipe section 20 may be formed of a rigid material, such as metal, aluminum or a hard plastic, or may present an exterior sleeve that is fixedly attached to the illuminator 18 and extends along the pipe 16 for a predetermined length. More preferably, the non-flexible section 20 presents a length within the range of 10 to 20 cm.

As shown in FIG. 4, the preferred pipe 16 may include a fiber optic core 22 and an exterior sheath 24 configured to form superjacent layers with at least a portion of the core 22. The sheath 24 is inelastically bendable and self-supporting, i.e. able to hold its shape. In a preferred embodiment, the sheath 24 includes at least one, and more preferably, a plurality of symmetrically spaced bendable wires 26 having a longitudinal axis parallel with the central axis of the pipe 16. The preferred pipe 16 further includes a flexible opaque layer 28 preferably intermediate the core 22 and sheath 24. The layer 28 preferably presents a light-reflective surface adjacent the core 22 so that no light is absorbed thereby. In a preferred embodiment, where the layer 28 is included, the sheath 24 extends only along a portion of the core 22 adjacent the inlet 16a, so that a more flexible and easily manipulated portion of the pipe 16 is presented adjacent the outlet 16b.

As shown in FIGS. 1 through 4, the preferred illuminator 18 is configured to be interconnected with the backrest 12a of the operatory chair 12 in lieu of a conventional headrest. The illuminator/headrest 18 is preferably removably interconnected to the backrest 12a; wherein the term "removably interconnected" shall mean able to be manually dismantled by a human user without the aid of a tool. As it is appreciated by those in the relevant arts that conventional operatory chairs generally present universal interconnection mechanisms and dimensions, it is more preferable and an intended benefit of the invention for the illuminator 18 to be configured so as to be interconnectable with conventional chairs 12 and thereby more easily implemented in existing operatory settings.

As shown in FIG. 2, for example, where the conventional chair 12 presents a universal female receptacle 30, the apparatus 10 preferably includes a male prong 32 configured to be tightly received by the receptacle 30. For example, where the receptacle 30 presents a planar rectangular cross-section that extends within the backrest 12a a depth not less than one-third the longitudinal length of the backrest 12a (FIGS. 3 and 4), the prong 32 preferably presents a similar rectangular cross-section having dimensions slightly less than (e.g., 95 percent of) the cross-sectional dimensions of the receptacle 30. The prong 32 is formed of a durable rigid material such as steel, aluminum, or a hard plastic (e.g., polyvinyl chloride).

In an alternative embodiment, the prong 32 presents a longitudinal bend 34 that forms a seat with the backrest 12a when fully inserted, as shown in FIG. 4a. This configuration results in a gap sufficient for improving airflow to and from the illuminator 18. More preferably, the bend 34 is located, so as to result in a 5 to 15 cm spacing between the illuminator 18 and the backrest 12a.

The illuminator 18 functions to provide a soft comfortable interface for engaging the head of the patient 14, and to generate a desired type and quantum of radiation. In a preferred embodiment, the illuminator 18 is configured to generate visible light (i.e., radiation having wavelengths within the range 400 to 700 nm) at a sufficient intensity to illuminate a desired portion of the patient. For example, in a dentistry application, it may be desired to illuminate the oral cavity and immediately surrounding areas of the patient. As such, the illuminator 18 includes a light source 36 (FIGS. 5 through 6*a*) that is communicatively coupled to the inlet 16*a* of the pipe and configured to produce light having a minimum luminosity value, and more preferably a lumens output not less than 100 and most preferably not less than 500, as measured at the outlet 16*b* of the pipe when energized. In this configuration, the preferred light source 36 may present a 50-watt dual pin halogen lamp light bulb or a high intensity LED lamp powered by a 12V power supply.

Returning to FIG. 4, the illuminator 18 includes a housing 38 that provides the structural capacity thereof, and defines an interior space 40 wherein the functional components, including the light source 36, are retained. The preferred housing 38 presents a polygonal configuration and is securely connected to the light pipe 16 and male prong 32 preferably along opposite planar surfaces. In a preferred embodiment, both the prong 32 and pipe 16 are not integrally attached to the housing 38, so as to be removable and thereby easily replaceable; for example, where a male prong having differing dimensions is needed to connect to a second chair. However, it is appreciated that the male prong 32 may be integrally formed (e.g., cast molded) with at least a portion of the housing 38 where desired. The housing 38 is preferably rotatably connected to the pipe 16 at or near the inlet 16*a*. The inlet 16*a* is preferably adjacent or slightly disposed within the space 40 directly above the light source 36.

As previously mentioned, the illuminator 18 presents a soft exterior surface for engaging the head of the patient 14. In a preferred embodiment, a multi-layer exterior cover 42 forms superjacent layers with at least the exterior surface of the housing that engages the patient's head. More preferably, the cover 42 overlays the entire exterior surface of the housing, except for the provisions further described herein, such as, for example, a top orifice for receiving the inlet 16*a* of the pipe. As shown in FIG. 4, the preferred cover 42 consists essentially of a thermo-insulating interior layer 44, a soft intermediate cushion layer 46, and a flexible yet durable exterior layer 48 (e.g., leather) that is non-reactive to human skin and the substances anticipated to be encountered in a given operatory settings, such as water, saline-solution, blood, etc. It is appreciated that two or more of the layers 44-48 may be combined; for example, wool felt or an equivalent soft synthetic material that is both soft and thermally insulating may supplant the inner layers 44,46.

The illuminator 18 includes a power supply 50 at least partially retained Within the housing 38 and communicatively coupled to and operable to energize the light source 36 (FIGS. 5 and 6). For example, the power supply 50 may present a 12V battery (FIG. 6). In addition to or in lieu of battery power, the power supply 50 may be configured to connect to a standard wall 120V alternating current source; and as such, may include an adaptor chord and plug (FIG. 5), a transformer 52 for stepping down the charge, and a rectifier 54 for converting to direct current. More preferably, a dual power supply 50 is redundantly provided having both a battery and AC adapting elements. In this configuration, the battery is preferably coupled to and rechargeable by the AC adapting elements.

Especially where incandescent light production is provided, the preferred illuminator 18 is further configured to dissipate and direct heat associated with the generation of the desired radiation away from the patient 14, and as such includes a cooling mechanism 56. In the illustrated embodiment, a miniature fan retained within the housing 38, and coupled to the power supply 50 presents the cooling mechanism 56 (FIGS. 5 and 6). In this configuration, the housing 38 defines at least one intake opening 58 spaced from and at least one outlet opening 60 adjacent the fan 56 (FIGS. 2 through 4*a*). The fan 56 and said at least one inlet and outlet openings 58,60 are cooperatively configured to draw ambient air into the housing 38 and expel heated air out of the housing 38 at a minimum rate, and more preferably at a rate not less than 10 cfm. The fan is preferably quiet during operation.

As shown in FIG. 2, the intake 58 may be presented by a plurality of vertical slat openings or louvers defined by the lowermost third of the sides of the housing 38. The outlet 60 may be presented by a window defined by the uppermost third of the rear panel of the housing 38 (FIG. 3). It is appreciated in this configuration that ambient air would be drawn in from the front of the illuminator 18 and to the left and right of the patient 14, which further provides the benefit of creating a gentle breeze that comforts the patient 14. The air then flows through the space 40 moving upward and towards the top of the rear panel, where it is expelled by the fan 56 through the outlet 60 in an opposite direction from the patient 14. Finally, screens 62 configured to allow the passage of air but not large air-borne particles or other foreign objects preferably protect both the intake and outlet openings 58,60.

As alternatively shown in FIGS. 4*a* and 7*a*, the intake 58 may present a plurality of slats or louvers defined by the uppermost panel of the housing 38 (FIG. 7*a*), while the outlet 60 is defined by the lowermost panel of the housing 38. As such, in this configuration, the fan 56 is positioned adjacent the lowermost panel and aligned with the outlet 60, so that air flows from the top of the housing 38 into the space 40 and out the bottom panel. It is appreciated that the gap between the headrest 18 and backrest 12*a* provided by the bent prong 34 facilitates airflow in this configuration. In this configuration, the preferred outlet 60 further present a series of diagonally distending guides 64 for throwing the heated air away from the patient 14.

As shown in FIG. 6, the preferred illuminator 18 also includes a potentiometer or a digitally controlled potentiometer (DCP) 66 intermediately coupled to the power supply 50 and light source 36, and a second potentiometer 68 between the power supply 50 and fan 56. As is known in the art, the potentiometers 66,68 function to adjust the voltage delivered to the light source 36 and fan 56 by changing the resistance within the circuit, so as to vary their intensity and rpm, respectively. Rotary potentiometers are shown in FIGS. 7 and 7*a*; however, it is appreciated that other configurations such as faders may be utilized instead. Alternatively, and as shown in FIG. 5, since the amount of light is directly proportional to the amount of heat generated and therefore the need for cooling airflow, a single potentiometer may be connected in series between the power supply 50 and both the light source 36 and fan 56.

II. Modular Headrest and Multi-Light Source Apparatus

More preferably, the illuminator 18 is further configured to be capable of providing at least one other type of radiation (excluding heat energy) when desired, and as such presents a "multi-light" apparatus. In this regard, at least one light source is configured to produce a plurality of differing types of radiation when energized. A single light source may be individually combined with a plurality of optical filtering, reflecting and/or modifying sets (not shown) as selected, such as is disclosed by U.S. Pat. No. 4,608,622 (incorporated by reference herein), to cooperatively produce a plurality of differing radiation products. A selection mechanism 70 is coupled to said at least one light source and configured to cause the light source to produce a selected radiation type (FIG. 5). In the '622 patent, for example, such a mechanism is presented by a turn table connected to the sets. Thus, the need to have a separate light apparatus, such as a dental curing light, in the operatory workspace is eliminated.

More preferably, a plurality of light (i.e., radiation) sources is utilized to reduce complexity. In the illustrated embodiment, a second light source 72 is further included (FIGS. 5 through 6*a*), with the understanding that yet additional light sources could be similarly provided and configured. The preferred second source 72 is configured to produce a second type of radiation selected from the group consisting of blue light, near, far and extreme ultra-violet radiation, and x-ray radiation. For example, for dental applications, the second light source 72 is preferably configured to produce ultra-violet and to a lesser extent blue radiation having wavelengths within the range 250 to 500 nm for use in photo-polymerization. It is appreciated by those of ordinary skill in the art that at these wavelengths common curing initiators, such as Camphorquinone (CQ) and Phenyl propanedione (PPD) are activated.

The second source 72 may therefore utilize technology selected from the group consisting of quartz-tungsten-halogen, argon laser, plasma-arc (PAC), light-emitting diode, multi-spectrum LEDS, and similar variants or combinations thereof, with the understanding that different technologies will present different characteristics and concerns relating to the range of output wavelengths, amount of heat and infrared by-product, operational and replacement costs, irradiance (mW/cm$^2$), and useful life, etc. It is also appreciated that filters such as dichroic reflectors (not shown) may be utilized to form a band-pass that eliminates unwanted wavelengths of radiation produced by a particular technology.

As shown in FIGS. 5 and 6, the light pipe 16 is interchangeably used for both visible light and alternative radiation source applications. As such, the pipe length is of sufficient value not only to illuminate, but to also enable the outlet 16*b* to enter and be manipulated within the oral cavity as is necessary to effectively deliver the alternate radiation. It is yet further appreciated that the outlet size is indirectly proportional to the irradiance provided by the second source 72. As such, the outlet 16*b* is not only sized to provide sufficient illumination in the visible light mode, but to also result in sufficient irradiance and collimation when applying the alternative radiation source 72. In a preferred embodiment, the outlet 16*b* presents a cross-sectional area not less than 1.5 cm$^2$. The preferred outlet 16*b* is adjustable between one of a plurality of configurations either by interchangeably replacing a distal portion of the pipe 16 or by rotating a dual mode tip 74 (FIG. 2). For example, the tip 74 may present in a first position collimating or reflective characteristics that increase collimation for curing, and maximally reduce this effect in a 90 degree offset position so as to spray visible light.

The light sources 36,72 are positioned and oriented so as to each be communicatively coupled to the inlet 16*a* of the light pipe, individually. As shown in FIGS. 5 through 6*a*, the light sources 36,72 may be positioned at or near the top and about the vertical central axis of the housing 38. In a preferred embodiment, the selection mechanism 70 presents a dial rotatably connected to the top surface of the housing 38. The dial 70 is co-axially aligned with the vertical central axis, and is diametrically configured relative to the spacing of the sources 36,72, so as to overlay both. Dual orifices 76 are defined by the housing 38 adjacent each of the sources 36,72, and an orifice 78 through which the pipe inlet 16*a* is eccentrically connected is defined by the dial 70 as shown in FIG. 4, so that the inlet 16*a* may be alternatively coupled to each of the sources 36,72.

In a the illustrated embodiment, the preferred dial 70 is further configured to activate and cause to be energized the selected light source 36 or 72 (FIGS. 5 and 6). More particularly, wire leads feeding each of the sources 36,72 are interrupted adjacent the dial 70. The dial 70 includes at least one conductive branch positioned and oriented to contact the leads and complete the respective circuit only when the dial orifice and inlet 16*a* are properly aligned with the source orifice, so that the dial 70 presents a rotary switch.

A heat shield 80 preferably distends from the top of the housing 38 and between the sources 36,72, so that damage caused by heat generated during the operation of the other is reduced. Similarly, as shown in FIG. 4, a protective sleeve 82 is also preferably included within the space 40, and configured to form a barrier between the outlet and inlet 58,60 and the radiation sources 36,72, so that the radiation is contained within the housing 38.

In an alternative embodiment, the dial 70 may be fixedly connected to at least one reflective surface distending within the housing 38. The reflective surface is configured to reflect at least a portion of the selected radiation product towards the inlet 16*a* (FIG. 6*a*). In this configuration, the pipe 16 is preferably co-axially aligned with the dial 70 and vertical central axis (FIGS. 6*a* and 7*a*). More preferably, the reflective surface is presented by the interior surface of an L-shaped tubular member 84 that distends from the dial 70 (FIG. 6*a*) in lieu of the heat shield 80. A chamfered bend 84*a* is provided at the elbow of the member 84. The bend 84*a* presents an interior reflective surface having a forty-five degree slope, so that horizontally projected radiation is redirected ninety-degrees upwards towards the inlet 16*a* directly above. It is appreciated that the slope angle changes for non-horizontal angles of incident. To facilitate this function, the preferred member 84 further includes a flared end section 84*b* for funneling light interiorly and a collimating element (e.g., lens) 86 adjacent the end section 84*b* for collimating the rays of light prior to reaching the bend 84*a*. Opposite the member 84 each of the sources 36,72 may be further paired with a rear reflective closed tubular section 88 for further directing radiation towards the inlet 16*a*.

In operation, once the patient 14 is properly positioned within the chair 12, the power supply 50 of the illuminator 18 may be actuated, for example, by depressing a main switch 90 located on the top of the housing 38 (FIGS. 7 and 7*a*). Next, the desired radiation type may be selected by rotating the dial 70 until visible indicia 92, such as the alignable markings shown in FIGS. 7 and 7*a*, indicate proper dial positioning for the given source 36 or 72. Once selected, the source 36 or 72 becomes energized, thereby producing the desired radiation. Indicator lights 94,96 are provided on top of the housing to further indicate the activation of the selected source 36 or 72. As shown in FIGS. 5 and 6, the preferred indicator lights 94,96 are produced by energizing an LED in series connection to the particular source 36 or 72. The preferred indicator lights 94,96 present different colors for distinguish the light sources 36,72; for example, a blue LED may be utilized in conjunction with a UV source 72, and a yellow LED with a visible light source 36.

The preferred forms of the invention described above are to be used as illustration only, and should not be utilized in a limiting sense in interpreting the scope of the general inventive concept. Obvious modifications to the exemplary embodiments and methods of operation, as set forth herein, could be readily made by those skilled in the art without departing from the spirit of the present invention. The inventor hereby states his intent to rely on the Doctrine of Equivalents to determine and assess the reasonably fair scope of the present invention as pertains to any system or method not materially departing from but outside the literal scope of the invention as set forth in the following claims.

What is claimed is:

1. A headrest adapted for use and interconnection with a conventional modular operating chair, and for supporting the head of and illuminating a patient positioned within the chair, said headrest comprising:
   a light source configured to produce a quantity of light having a minimum luminosity value when energized;
   a light pipe defining an inlet communicatively coupled to the light source, a longitudinal pipe length, and an outlet positioned at a first location and configured to transmit the light towards the patient;
   a housing solely supporting, and configured to retain the light source, securely coupled to the pipe, and presenting a soft exterior surface defining a shape, orientation, and surface area operable to support the head of the patient, when the patient is positioned within the chair; and
   a power supply communicatively coupled to and operable to selectively energize the light source.

2. The headrest as claimed in claim 1, wherein at least a portion of the light pipe is rigidly flexible, so as to be adjustably bendable to one of a plurality of functional conditions wherein the outlet is manually repositioned to a second location spaced from the first.

3. The headrest as claimed in claim 2, wherein the light pipe includes a non-flexible extender section adjacent the inlet.

4. The headrest as claimed in claim 2, wherein said pipe includes a fiber optic core and an exterior sheath configured to form superjacent layers with at least a portion of the core, and the sheath is inelastically bendable.

5. The headrest as claimed in claim 4, wherein said pipe further includes a flexible opaque layer adjacent the core, and the sheath extends only along a portion of the core and layer adjacent the inlet, so as to present a more flexible and manipulable distal section.

6. The headrest as claimed in claim 1, further comprising:
   a cooling mechanism further supported solely by the housing,
   said light source further producing a quantity of heat when energized,
   said mechanism being configured to dissipate the heat from the housing at a minimum rate.

7. The headrest as claimed in claim 6, wherein the mechanism includes a fan retained within the housing and communicatively coupled to the power supply, the housing defines at least one inlet opening spaced from and at least one outlet opening adjacent the fan, and the fan and said at least one inlet and outlet openings are cooperatively configured to draw ambient air into the housing and expel heated air out of the housing and away from the patient.

8. The headrest as claimed in claim 7, wherein a potentiometer is communicatively coupled intermediate the power supply and fan, and configured to adjust the output of the fan.

9. The headrest as claimed in claim 1, further comprising:
   an interconnection mechanism fixedly secured to the housing, and cooperatively configured with the chair, so as to enable the manual connection and disconnection of the headrest and chair.

10. The headrest as claimed in claim 1, wherein the power supply includes an adaptor chord and outlet plug for connecting to an alternating current circuit, and further includes a transformer and rectifier intermediate the plug and light source for converting alternating current into reduced voltage direct current.

11. The headrest as claimed in claim 1, further comprising:
    at least one reflective surface positioned within the housing, and configured to reflect at least a portion of the light and direct it towards the inlet.

12. The headrest as claimed in claim 1, further comprising:
    a potentiometer intermediate the power supply and light sources, and configured to adjust the intensity of the light sources.

13. The headrest as claimed in claim 1, further comprising:
    a soft multi-layered cover adjacent the exterior of the housing, wherein the cover includes a thermo-insulating interior layer and a non-reactive exterior layer.

14. A multi-light headrest adapted for use and interconnection with a conventional modular operating chair, and for supporting the head of a patient positioned within the chair, and engaging the patient with multiple types of radiation, said headrest comprising:
    at least one light source configured to selectively produce one of a plurality of differing types of radiation, wherein each type presents a different wavelength;
    a selection mechanism coupled to said at least one light source and configured to cause the light source to produce the selected radiation type;
    a light pipe defining an inlet able to be communicatively coupled to each of said at least one light source, a longitudinal pipe length, and an outlet positioned at a first location and configured to transmit the selected radiation type towards the patient;
    a housing solely supporting and configured to retain said at least one light source, securely coupled to the pipe, and presenting a soft exterior surface defining a shape, orientation, and surface area operable to support the head of the patient, when the patient is positioned within the chair;
    an interconnection mechanism fixedly secured to the housing, and cooperatively configured with the chair, so as to enable the manual connection and disconnection of the headrest and chair; and
    a power supply communicatively coupled to and operable to selectively energize each of said at least one light source.

15. The headrest as claimed in claim 14, further comprising:
    a first light source configured to produce visible light, when energized; and
    a second light source configured to produce a second type of radiation selected from the group consisting of blue light, and near, far and extreme ultra-violet, radiation.

16. The headrest as claimed in claim 15, wherein the first light source includes a halogen lamp light bulb or high intensity light emitting diode (LED) lamp, and the second light source utilizes technology selected from the group consisting of quartz-tungsten-halogen, argon laser, plasma-arc (PAC), and multi-spectrum LEDs.

17. The headrest as claimed in claim 15, wherein the first and second sources may be individually energized, and the selection mechanism is further configured to communicatively couple the inlet to a selected one of the first and second light sources, and to concurrently cause the selected one of the sources to be energized.

18. The headrest as claimed in claim 17, wherein the selection mechanism includes a dial connected to the pipe at or near the inlet, rotatably coupled to the housing, and configured to complete separate first and second circuits including the first and second light sources respectively.

19. The headrest as claimed in claim 16, wherein a reflective surface distends from the dial and is configured to selectively receive radiation from the selected one of the first and second light sources and reflect the radiation towards the inlet.

20. The headrest as claimed in claim 9, further comprising:

at least one male connecting prong fixedly attached to the housing, said chair defining at least one receptacle configured to slidingly and removably receive the prong, said at least one prong and receptacle being cooperatively configured to secure the housing in a fixed position relative to the chair.

* * * * *